(12) United States Patent
De Peuter et al.

(10) Patent No.: US 11,102,072 B2
(45) Date of Patent: Aug. 24, 2021

(54) SYNTHETIC OBJECTS IN SERVICE MODELS

(71) Applicant: BMC Software, Inc., Houston, TX (US)

(72) Inventors: Geert De Peuter, Turnhout (BE); Stephen Palla, Jacksonville, FL (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 16/389,538

(22) Filed: Apr. 19, 2019

(65) Prior Publication Data

US 2020/0336378 A1 Oct. 22, 2020

(51) Int. Cl.
*G06F 15/16* (2006.01)
*H04L 12/24* (2006.01)
*H04L 29/06* (2006.01)

(52) U.S. Cl.
CPC ...... *H04L 41/0873* (2013.01); *H04L 41/0853* (2013.01); *H04L 41/12* (2013.01); *H04L 41/5045* (2013.01); *H04L 69/163* (2013.01)

(58) Field of Classification Search
CPC ............ H04L 41/0873; H04L 41/0853; H04L 41/5045; H04L 69/163; H04L 41/12
See application file for complete search history.

(56) References Cited

U.S. PATENT DOCUMENTS

| | | | | |
|---|---|---|---|---|
| 5,926,463 A * | 7/1999 | Ahearn | ................. | H04L 41/024 370/254 |
| 7,016,980 B1 * | 3/2006 | Mayer | ................. | H04L 41/0853 709/248 |
| 7,526,536 B2 * | 4/2009 | Bhogal | ................. | H04L 67/125 709/220 |
| 10,282,280 B1 * | 5/2019 | Gouskova | ........... | G06F 11/3664 |
| 10,296,412 B2 * | 5/2019 | Oleynikov | .............. | H04L 67/22 |
| 2002/0052941 A1 * | 5/2002 | Patterson | ................ | H04L 67/34 709/223 |
| 2007/0014233 A1 * | 1/2007 | Oguro | ................. | H04L 41/0631 370/216 |
| 2007/0058631 A1 * | 3/2007 | Mortier | ............... | H04L 43/0811 370/392 |

(Continued)

*Primary Examiner* — Hieu T Hoang
(74) *Attorney, Agent, or Firm* — Brake Hughes Bellermann LLP

(57) ABSTRACT

A method for determining a misconfiguration of components in an Information Technology (IT) infrastructure includes decomposing one or more components into sub parts, creating one or more synthetic objects, each synthetic object being associated with a sub part of a respective component, and including the components and the synthetic objects in a model of the IT infrastructure. The method further determines a relationship between a first component and a first synthetic object based on attributes of the first component and attributes of the first synthetic object, includes the determined relationship in the model of the IT infrastructure, and loads a graph of the IT infrastructure in a graph database with the first component and the synthetic object as nodes and the determined relationship as an edge in the graph. The method further determines the misconfiguration of components in the IT infrastructure by identifying components having improper relationships in the graph.

21 Claims, 7 Drawing Sheets

(56) References Cited

U.S. PATENT DOCUMENTS

| | | | |
|---|---|---|---|
| 2007/0070987 A1* | 3/2007 | Shibasaki | H04W 76/18 370/352 |
| 2008/0180718 A1* | 7/2008 | Yamashita | G06F 11/0709 358/1.15 |
| 2010/0082674 A1* | 4/2010 | Yiu | G06F 40/232 707/780 |
| 2010/0306378 A1* | 12/2010 | Christenson | H04L 29/12264 709/226 |
| 2012/0154165 A1* | 6/2012 | Bower, III | G06F 15/161 340/687 |
| 2013/0091258 A1* | 4/2013 | Shaffer | H02J 3/00 709/221 |
| 2015/0016277 A1* | 1/2015 | Smith | H04L 43/0823 370/244 |
| 2015/0043378 A1* | 2/2015 | Bardgett | H04L 12/4641 370/254 |
| 2015/0149603 A1* | 5/2015 | Mizutani | H04L 41/0813 709/220 |
| 2015/0149944 A1* | 5/2015 | Franzen | G05B 17/02 715/771 |
| 2016/0124823 A1* | 5/2016 | Ruan | G06F 11/0709 714/26 |
| 2016/0170388 A1* | 6/2016 | Haas | H04L 67/34 700/9 |
| 2017/0249126 A1* | 8/2017 | Manevich | G06F 11/3664 |
| 2018/0270114 A1* | 9/2018 | Indiresan | H04L 41/0883 |
| 2018/0349524 A1* | 12/2018 | Treptow | H04L 41/145 |
| 2018/0351806 A1* | 12/2018 | Mohanram | H04L 41/0873 |
| 2019/0268218 A1* | 8/2019 | Thomasson | H04L 41/12 |
| 2020/0053116 A1* | 2/2020 | Soroush | H04L 63/1433 |
| 2020/0084161 A1* | 3/2020 | Paul | H04L 41/5051 |
| 2020/0145288 A1* | 5/2020 | Mermoud | H04L 61/2015 |

\* cited by examiner

SYNTHETIC OBJECTS IN SERVICE MODELS

TECHNICAL FIELD

This description relates to computer networks and the configuration of computer network components used to support services on the computer networks.

BACKGROUND

Businesses and organizations rely more and more on networked computers ("Information Technology (IT) infrastructure) for information and services. The IT infrastructure can include components (e.g., configuration items (CI)) that need to be managed to ensure successful delivery of services. Some component types may be virtual, while others may be physical. The components may, for example, include assets such as servers, computers, smartphones, databases or data stores, operating system, application software, and hardware components as well as computer networks such as private and public networks (including the Internet).

In computer networking, a network service ("IT service") is an application running at the network application layer (and above layers) that provides data storage, manipulation, presentation, communication or other capability. An IT service may be implemented using a multi-tier architecture including, for example, a web-tier, an application tier and a database tier, with each tier providing computing and/or storage services.

The components available in the IT infrastructure can be specifically configured (i.e., interconnected or linked) to support the IT service. In many scenarios (e.g., in dynamic or cloud computing scenarios) the available components of the IT infrastructure can change with time. Changes in the availability or characteristics of the components can impact service availability. IT service management (ITSM) personnel may use discovery tools (e.g., a digital enterprise management solution such as BMC Discovery) to inventory the components of the IT infrastructure (premise, cloud, and serverless infrastructure) and keep track of changes occurring in the components. An inventory of components may be stored in a database (e.g., in a configuration management database (CMDB)). The ITSM personnel may refer to the inventory of components (e.g., as stored in a CMDB) when specifically configuring the available IT infrastructure components to support the IT service. The IT infrastructure components may be interconnected with the relationships between the components playing an important role in how the components are interconnected to support the IT service. While the inventory of components obtained by traditional discovery tools may identify and list the available IT infrastructure components, the list may not provide, or include description of, relationships (i.e., inter-connections) between the various components in the IT infrastructure.

A service model can specify which higher-level entities, such as applications, technical services, business services, and organizations are impacted, and how they are impacted when lower-level IT infrastructure entities, such as servers, network devices, and application systems are affected by some condition.

While the traditional discovery tools can identify and list the components of the IT infrastructure, the connections between the components are not directly known to the discovery tools. Thus, for the service model, relations between the components may have to be manually defined. However, manually defining the relations between the components at time of discovery is not always possible, or can be very expensive or time consuming. For example, a first component (e.g., a host) may be identified as being connected to a second component (e.g., a target system named "target.example.com"). However, name resolution is usually required in order to know the Internet Protocol (IP) address of the target system. This name resolution may end up with an IP address that happens to be a third component's IP address (e.g., a load balancer's IP address). Thus, resolving the target(s) for the host connection can require expensive or time consuming discovery of a prohibitively large amount of data.

Consideration is being given to systems and methods for finding, and determining relationships between components of an IT infrastructure with a view to calculating an impact of a change in the conditions of the components on service availability. The relationships between the components in the IT infrastructure are represented in a service model. Further, consideration is given to making the relationships between the components visible in graphs (e.g., as visual aid for managing the IT infrastructure).

SUMMARY

A method for determining a misconfiguration of components in an Information Technology (IT) infrastructure includes decomposing one or more components into sub parts, creating one or more synthetic objects, each synthetic object being associated with a sub part of a respective component, and including the components and the synthetic objects in a model of the IT infrastructure. The method further involves determining a relationship between a first component and a first synthetic object based on attributes of the first component and attributes of the first synthetic object, including the determined relationship in the model of the IT infrastructure; and loads a graph of the IT infrastructure in a graph database with the first component and the synthetic object as nodes and the determined relationship as an edge in the graph. The method further determines the misconfiguration of components in the IT infrastructure by identifying components having improper relationships in the graph.

The details of one or more implementations are set forth in the accompanying drawings and the description below. Other features will be apparent from the description and drawings, and from the claims.

DETAILED DESCRIPTION

Figure 1:
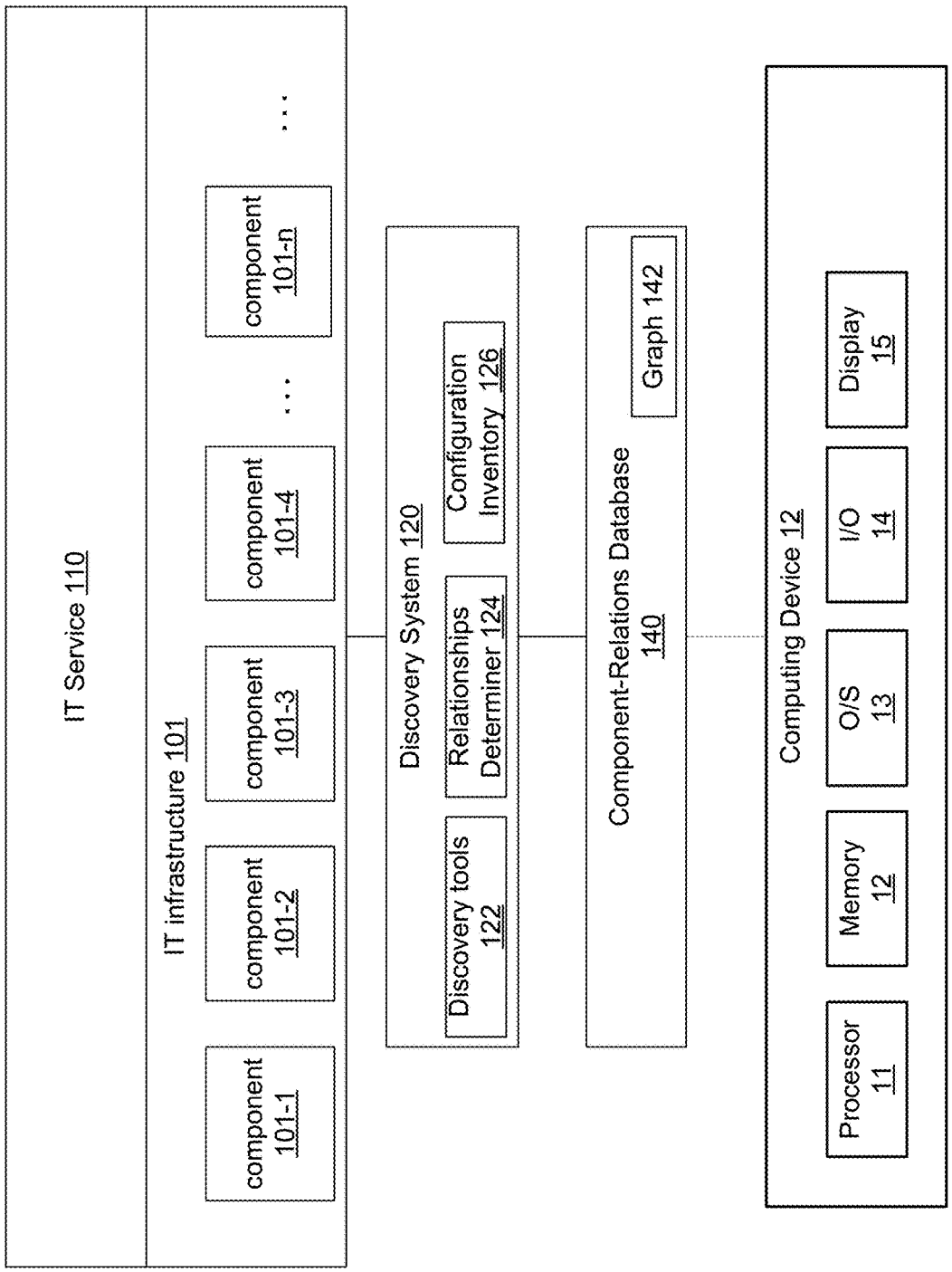
FIG. 1 is a schematic block diagram illustrating an IT infrastructure coupled to a component discovery system and a component-relations database, in accordance with the principles of the present disclosure.

An Information Technology (IT) infrastructure (e.g., a public cloud, a private cloud, or an on-premise system) can host one or more services ("IT services"). The IT infrastructure may encompass or include a variety of assets (e.g., hardware, software and firmware components) used to implement an IT service. These components may span one or more of on-premise, public cloud, private cloud, and traditional data center environments. The components used to implement the IT service may, for example, include one or more servers (e.g., web servers, application servers, proxy servers, reverse proxy servers, etc.), databases, software code, network components, applications and other services. The components available in the IT infrastructure can be specifically configured (e.g., by ITSM personnel) to support the IT service. In many scenarios (e.g., in dynamic or cloud computing scenarios) the components of the IT infrastructure can change with time. Discovery tools (e.g., a digital enterprise management solution, such as BMC Discovery) may be used to inventory the components of the IT infrastructure (on-premise, cloud, and serverless infrastructure) and keep track of changes occurring in the inventory of components. The inventory of components may be stored in a database (e.g., in a configuration management database (CMDB)). The inventory may be referred to when managing the IT infrastructure, for example, for specifically configuring the available components to support the IT service on the IT infrastructure (or in general, for ITSM change management, software asset management, customer service management, security operations, etc.).

A discovery system may be configured to discover IT infrastructure components and to retrieve component properties. Relationships between the discovered IT infrastructure components can be inferred using a generic relation inference model. A graph may be used to represent the network connections of the components in the IT infrastructure. In the graph, the discovered IT infrastructure components may be shown as nodes (i.e., vertices) and the relationships (i.e., connections) between the components may be shown as edges between the nodes. The graph may be stored in a graph database and displayed as a visual image on a user interface. The visual image may provide a quick and complete depiction of the IT infrastructure, which can be helpful (e.g., to ITSM personnel) in managing the IT infrastructure.

A service model is a generic term for a logical representation of the relationships between IT infrastructure components ("components") that are used to provide an IT service ("service").

The present disclosure provides systems and methods to model (e.g., to create a service model) and visualize all the relationships between service consumers and service providers in an IT infrastructure. The modeling may use discovered configuration data of the services to build the service model. The modeling may be based on having access to configuration data (e.g., runtime or offline configuration) of all the service components in the IT infrastructure.

IT Infrastructure, Example I

Consider an example scenario in which there is configuration data for any number of instances of component classes (e.g., "WEBSERVER," "APPSERVER" and "DB SERVER") of an example IT infrastructure. For purposes of generating a service model, it can be assumed or known that a pre-defined relationship exists between WEBSERVER and APPSERVER and a pre-defined relationship exists between APP SERVER and DB SERVER.

A traditional method for generating a service model and visualizing the inter-component relationships may involve, for example, for each WEBSERVER, finding a configuration parameter that includes a description of a particular APPSERVER that WEBSERVER is configured to be connected to. The traditional method may further involve searching for the particular APPSERVER in an APPSERVER instances list, and if found, visualizing the relationship between the WEB SERVER and the particular APP SERVER.

The traditional method may further involve, for example, for each APPSERVER, finding a configuration parameter that includes a description of a particular DBSERVER that APPSERVER is configured to be connected to. The traditional method further involves searching for the particular DBSERVER in a DBSERVER instances list, and if found, visualizing the relationship between the APPSERVER and the particular DBSERVER.

It will be noted that only explicitly defined component-component relationships are found and visualized by the traditional method.

In accordance with the principles of the present disclosure, systems and methods for generating a service model, and visualizing inter-component relationships in an IT infrastructure, may involve discovering and visualizing inter-component relations that actually exist, but are not be explicitly defined. In other words, the discovered and visualized inter-component relations may be implicit. Synthetic objects may be introduced in the service model as additional components (e.g., dummy components) of the IT infrastructure that can participate in the implicit relationships between components of the IT infrastructure. A synthetic object may be defined by "decomposition rules" that separate real-world objects (e.g., WEBSERVER, APPSERVER and DBSERVER) (i.e., objects that are physically present) into sub parts (e.g., communication interfaces).

In example implementations, the synthetic objects may correspond to the communication interfaces of the real-world objects. The communication interfaces (e.g., TCP ports) of real-world objects may be identified by deconstructing (i.e., decomposing) a real-world object into its sub parts.

The decomposition rules may be directed toward creating relationships between different types of IT service consumers and IT service providers that are represented in the service model. For example, an IT service provider may include multiple elements, related to both infrastructure and application topology. Some of these elements may be implicit, but each element may be characterized by known properties. For example, if the IT service is "a inventory service running on a virtual machine (VM)", it is implicitly known that there will be at least one application (in the inventory), running on at least one VM that runs on at least one physical machine, which is hosted in exactly one datacenter. Some of the relationships may be implicit or inherent, because of their nature. For example, because of standardization of the IT infrastructure, a VM is always hosted on a physical server. Therefore, a relationship between a VM class and a physical machine is implicit.

IT Infrastructure, Example II

As a further example, consider a scenario of an airline that has a "booking system" that offers on-line booking through a "travel website". In this scenario, the "travel website" may be identified as the IT service consumer and the "booking system" may be identified as the IT service provider in the IT infrastructure. The traditional method for preparing the service model in this scenario may involve discovery of the website (i.e., travel website) and analysis of its configuration. One of the configuration entries (e.g., a "booking" configuration entry) may, for example, be a booking destination with an IP address value "10.1.1.1:2025". This relation can be modeled because it is known that the value for the "booking" configuration entry should contain the port number and the address of the booking service. Therefore, an application topology model may be hardcoded to include a "booking definition" relationship as follows:

WEBSITE—(booking definition)→BOOKING

However, an operations team responsible for the IT infrastructure may not have the same confidence as the modeler in the infrastructure configuration. The operations team may, for example, know that there may be other IT service providers running on different address/ports and cannot assume that the IT infrastructure was configured correctly. The operations team may face a problem of connecting the WEBSITE to a destination (e.g. other IT service provider) about which they may know nothing.

One possible solution to the problem may be to create a service model that connects the WEB SITE to any other possible IT service provider (e.g., e-mail "EMAIL SYSTEM", human resources "HR SYSTEM", etc.). An example service model may contain the following relationships list:

WEBSITE—(booking definition)→BOOKING
WEBSITE—(booking definition)→EMAIL SYSTEM
WEBSITE—(booking definition)→HR SYSTEM, where the EMAIL SYSTEM and the HR SYSTEM are additional systems serviced by the IT infrastructure.

Further, in the foregoing example, the BOOKING system may have been provisioned in a High Available (HA) mode with a load balancer component (e.g., "LOAD BALANCER") and may not directly accessible. All possible HA constructs must be added to the relationship list to complete the service model. For example, the model may include the following HA constructs:

WEBSITE—(booking definition)→LOAD BALANCER-
    →BOOKING
WEBSITE—(booking definition)→LOAD BALANCER-
    →EMAIL SYSTEM . . . .

The foregoing service model (constructed using the traditional method) may be impractical to implement and may be hard to maintain (e.g., as components of the IT infrastructure can change).

In an example implementation, the systems and methods of the present disclosure address the maintenance issue of the foregoing example service model by deriving synthetic objects from each interface type (e.g., Transmission Control Protocol (TCP), User Datagram Protocol (UDP), Internet Control Message Protocol (ICMP), etc.) of the IT service consumer and the IT service providers in the IT infrastructure.

A decomposition (or deconstruction) rule for identifying the synthetic objects may be, for example, based on a recognition that a WEBSITE has two sub parts (i.e., an infrastructure component and an application endpoint), and an interpretation that the "booking definition" relationship in the foregoing example model consumes a Transmission Control Protocol (TCP)-ENDPOINT of a relation that starts from the IT service consumer (WEBSITE). It is understood that the TCP-ENDPOINT has two mandatory properties i.e., "address" and "port". The BOOKING system will also expose a TCP ENDPOINT, and so will the HR system, and the EMAIL system, etc. Further, it is also understood the LOAD BALANCER exposes a TCP-ENDPOINT and connects to one or multiple TCP-ENDPOINTS of other components.

Using the foregoing mechanism of deconstructing real-world objects into their communication interfaces and identifying the communication interfaces as synthetic objects, the service model can include relationships defined on the synthetic objects.

The service model may, for example, include the following new definitions for relationships between components and synthetic objects (i.e., TCP-ENDPOINTs):

WEBSITE—(booking definition)→TCP-ENDPOINT
LOAD    BALANCER—(HA    definitions)→TCP-END-
    POINT, and the following synthetic object definitions:

BOOKING—(is also a)→TCP-ENDPOINT
EMAIL—(is also a)→TCP-ENDPOINT

Using these newer relationships and synthetic objects, new components that expose or consume TCP-ENDPOINTS can be added to the IT infrastructure for purposes of modeling. These new components will automatically be part of the service model.

With renewed reference to IT INFRASTRUCTURE, EXAMPLE I discussed above (for which there is configuration data for any number of instances of objects classes WEBSERVER, APPSERVER and DBSERVER), the following synthetic objects may be created for a service model.

Synthetic objects:
TCPPORT (outbound) from WEBSERVER
TCPPORT (inbound) to APPSERVER
TCPPORT (outbound) from APPSERVER
TCPPORT (inbound) to DBSERVER The foregoing definitions of the synthetic objects implicitly assume that a relationship exists between WEBSERVER→TCPPORT, TCPPORT→APPSERVER→TCPPORT, and TCPPORT→DBSERVER.

The method for generating a service model and visualizing the inter-component relationships disclosed herein may involve, for each WEB SERVER, iterating over the associated synthetic objects (i.e., TCPPORT objects) and drawing the relationship to the TCPPORT. The method may further involve, for each APPSERVER iterating over the associated synthetic objects (i.e., TCPPORT objects) and drawing the relationship to the TCPPORT; and, for each DBSERVER, iterating over the associated synthetic objects (i.e., TCPPORT objects) and drawing the relationship to the TCPPORT.

Modeling all of the relationships between service consumers and service providers, as described herein, utilizes discovered configuration data of the services. The modeling may be based on having access to configuration data (e.g., runtime or offline configuration) of all the service components in the IT infrastructure.

FIG. 1 is a block diagram of an example system 100 that includes a discovery system 120 coupled to an IT infrastructure 101, and includes a component-relations database 140 containing images or diagrams of IT infrastructure 101, in accordance with the principles of the present disclosure.

IT infrastructure 101 may include one or more components (e.g., component 101-1, component 101-2, component 101-3, component 101-4 . . . component 101-*n*, etc.). The components may include assets that span one or more of on-premise, public cloud, private cloud, and traditional data center environments. The components (and/or the configuration of components) in IT infrastructure 101 may change with time.

An IT service 110 may be hosted on an IT infrastructure 101. IT service 110 may use or require only a subset of the one or more components of IT infrastructure 101 101 for service operation. While one IT service 110 is shown in FIG. 1, other IT services (not shown) using one or more of the same assets as IT service 110 may be concurrently implemented on IT infrastructure 101.

Discovery system 120 coupled to IT infrastructure 101 may include discovery tools 122, a relationships determiner 124, and a configuration inventory 126 (store or database).

Discovery tools 122 (which may use traditional discovery techniques such as Ping Scan and Simple Network Management Protocol (SNMP) Scan) may be configured to discover the IT infrastructure components, the services that run on them, and the connections between the various components that work together to deliver these services. Discovery tools 122 may be configured to collect data uniquely identifying each discovered component in IT infrastructure 101 by its (component) properties, such as location, datacenter, Uniform Resource Locator (URL), IP address, port, protocol, customer, service name, . . . , etc. The data identifying the discovered components may be stored, for example, in configuration inventory 126.

In addition to collecting the data uniquely identifying each discovered component, discovery system 120 may include a data definition. The data definition may, for example, include unique index columns for a data class, and relationship definitions between the attributes for at least some classes. In example implementations, the data definition may include definition of one or more dummy (synthetic) objects that may be derived from first class data classes that have identities independent of any other database object.

While uniquely identifying the discovered components, discovery tools 122 may not directly provide the relationships between the discovered components. For example, a component may be identified as a web server; however, this identification may not be sufficient to identify, for example, the clients and services connected to the web server in IT infrastructure 101.

In accordance with the principles of the present disclosure, relationships determiner 124 may be configured to determine the relationships between the discovered components of IT infrastructure 101. Relationships determiner 124 may determine the relationships based, for example, on a component properties-to-relationships inference model. An example model is described later below (with reference to an example IT infrastructure: IT INFRASTRUCTURE, EXAMPLE III).

Relationships determiner 124 may update configuration inventory 126 to include the determined inter-component relationships along with the information identifying the discovered components.

Further, in system 100, discovery system 120 may construct a graph image (e.g., graph 142) of IT infrastructure 101. The components discovered by discovery tool 122 may be shown as nodes in graph 142, and the inter-component relationships inferred by relationships determiner 124 may be shown as edges in graph 142.

Graph 142 may be stored, for example, in component-relations database 140, and be accessible to a user device (e.g., a computing device 10 that, for example, includes a processor 11, a memory 12, an O/S 13, an I/O 14 and a display 15) coupled to component-relations database 140. In example implementations, component-relations database 140 may support complex queries and advanced visualization.

Discovery system 120 (including discovery tools 122, relationships determiner 124, and configuration inventory 126) and component-relations database 140 may be hosted on one or more stand-alone or networked physical or virtual computers (e.g., computing device 10).

Figure 2:
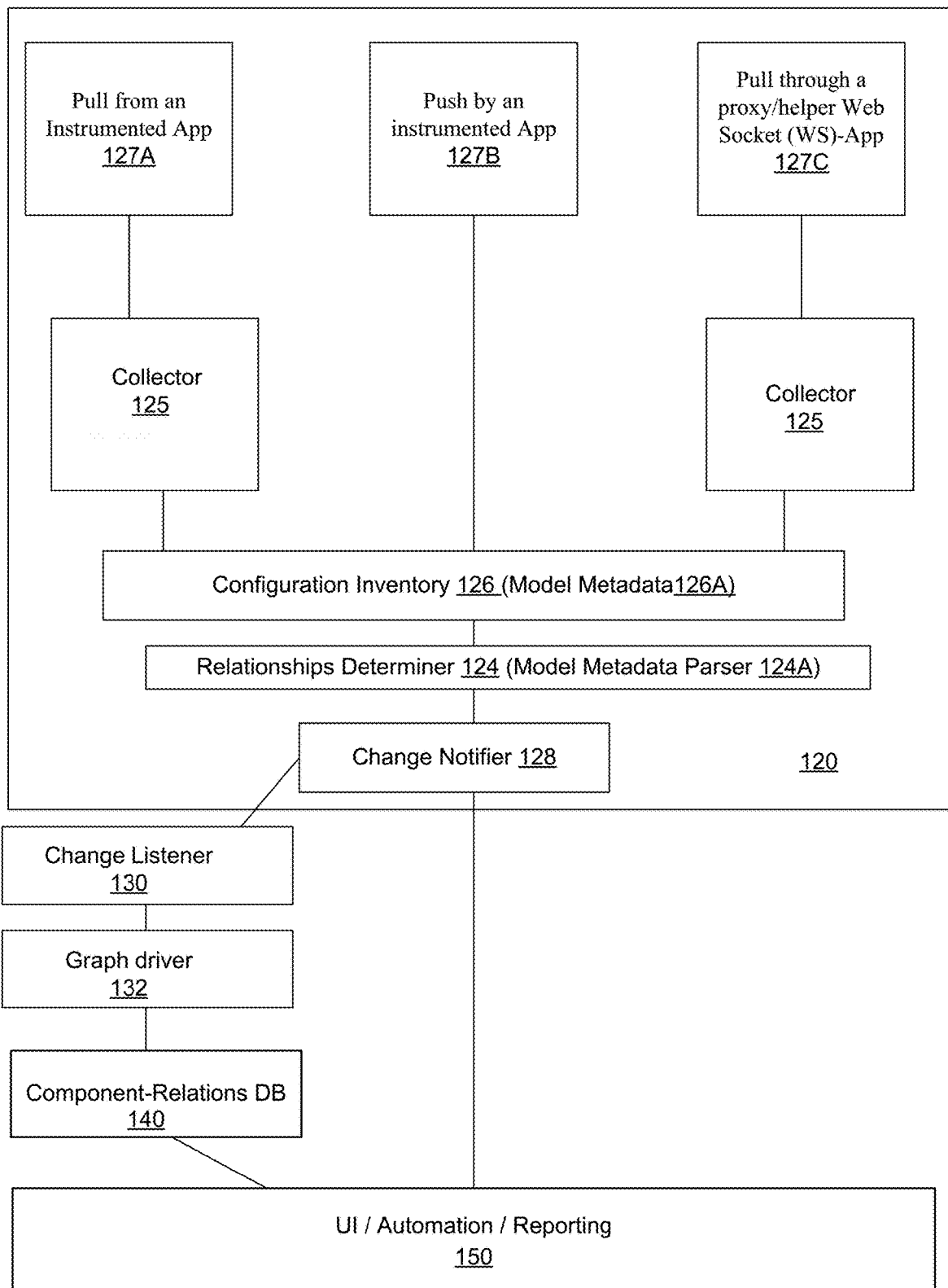
FIG. 2 is a schematic block diagram illustrating an example implementation of the component discovery system of FIG. 1, in accordance with the principles of the present disclosure.

FIG. 2 is a schematic block diagram of an example implementation of discovery system 120 (FIG. 1), in accordance with the principles of the present disclosure.

In the example implementation, discovery system 120 may include collectors 125 configured to collect data from remote components (e.g., component 101-1, component 101-2, component 101-3, component 101-4 . . . component 101-*n*, etc.) of IT infrastructure 101. In the example implementation, collectors 125 may collect the data of the remote components of IT infrastructure 101 using, for example, discovery tools 122 that include, for example, one or more of three methods (namely, method 127A, Pull from an Instrumented App; method 127B, Push by an instrumented App; and method 127C, Pull through a proxy/helper Web Socket (WS)-App). The collected data, which may uniquely identify the remote components, may conform to the data definition that includes unique index columns for a data class and includes relationship definitions between the attributes for certain classes. The data may be stored in configuration inventory 126.

The relationships between the remote objects may be established or identified by relationships determiner 124 with reference to a component properties-to-relationships inference model provided to discovery system 120. The model (e.g., prepared by a modeler) may be in the form of metadata.

The model metadata may be parsed (e.g., by model metadata parser 124*a* in relationships determiner 124) and applied to the identification data of the remote components to establish the relationships between the remote components of IT infrastructure 101. The relationships may be stored in configuration inventory 126 along with the identification of the remote components.

Further, as shown in FIG. 2, in example implementations, discovery system 120 may include a change notifier 128, which monitors changes to IT infrastructure 101 in time by monitoring corresponding changes or updates to configuration inventory 126. When a change or update occurs, change notifier 128 may generate an alert that can be recognized by a change listener 130 coupled to component-relations database 140. In response to the change or update, change listener 130 may activate a graph driver 132 that can update the graph image (e.g., graph 142) of IT infrastructure 101 with the notified changes to IT infrastructure 101 in time.

UI/automation/reporting unit 150 may determine a misconfiguration of components of the IT infrastructure from the graph, for example, by determining which components have improper relationships. In an example implementation, the misconfigured components having improper relations may be listed in a report. In example implementations, the misconfigured components having improper relations may be shown or highlighted in a visual display of graph 142. Graph 142 may, be displayed on a user interface (e.g., display 15) by UI/automation/reporting unit 150 for visual inspection.

As shown in FIG. 2, component-relations database 140 may be interfaced with computing devices or workstations (e.g., computing device 10) by UI/automation/reporting unit 150. Unit 150 can be used for controlling automated operation of discovery system 120, reporting, and displaying graph images of IT infrastructure 101 (e.g., on display 15 of computing device 10).

For purposes of illustration, example operation of system 100 for creating graph images of IT infrastructures is described below with reference to the following example IT infrastructure.

IT Infrastructure, Example III

Consider an example IT infrastructure (EXAMPLE III) spanning three geographically diverse networked data centers (uniquely named "HOU", "CHI" and "AMS," respectively) and serving clients over a network. The components at each three data centers may include reverse proxy servers that direct client requests to members of one or more named resource pools (which are partitions of computing and memory resources) at the data centers. A reverse proxy server may be uniquely identified by the name of data center it belongs to, a Uniform Resource Locator (URL) (colloquially termed "a web address") that specifies its location on the network, and a name of the resource pool it directs client requests to. Similarly, a resource pool member may be uniquely identified by the names of the data center and the resource pool it belongs to, and a unique name (e.g., a numerical identifier) of the resource pool member itself.

For this IT infrastructure EXAMPLE III, discovery tools 122 in discovery system 120 may collect inventory data on the components (i.e., datacenters, reverse proxy servers, and resource pool members) in the IT infrastructure with the data definition constraint that each data class (e.g., datacenter (DC), REVERSE_PROXY, and POOLMEMBER) has a unique index column. The inventory data may be collected in comma separated values (csv) format files. In example implementations, inventory data collected by discovery system 120 in each data class may be stored as data files (e.g., in comma separated value (csv), such as data files DC.csv, REVERSE_PROXY.csv, POOLMEMBER.csv) or in corresponding database objects. A database object is any defined object in a database that is used to store or reference data. Some examples of database objects include tables, views, clusters, sequences, indexes, and synonyms. An example data object is a table, which is a unit of storage composed of rows and columns. Within a table, each row represents a group of related data values. A row, or record, is also known as a tuple. A column in a table is a field and is also referred to as an attribute. An attribute is used to define the record and a record contains a set of attributes.

In example implementations, inventory data collected by discovery system 120 in each data class may be stored as table database objects. For example, the data files DC.csv, REVERSE_PROXY.csv, and POOLMEMBER.csv may be stored in tables as shown below in Table A: (DC.csv), Table B: (REVERSE_PROXY.csv), and Table C: POOLMEMBER.csv.

TABLE A (DC.csv)

| |
|---|
| DC |
| HOU |
| CHI |
| AMS |

TABLE B (REVERSE_PROXY.csv)

| DC | URL | POOL |
|---|---|---|
| HOU | hou-login.example.com | login |
| HOU | hou-db.example.com | db |
| CHI | chi-login.example.com | login |
| CHI | customer1.example.com | customer1 |
| AMS | customer2.example.com | customer-shared |

TABLE C (POOLMEMBER.csv)

| DC | POOL | POOLMEMBER |
|---|---|---|
| HOU | login | 10.0.0.1 |
| HOU | login | 10.0.0.2 |
| HOU | db | 10.1.0.0 |
| HOU | db | 10.2.0.0 |
| CHI | login | 10.10.0.1 |
| CHI | customer1 | 10.20.0.1 |
| AMS | customer-shared | 10.50.0.1 |

For each of the foregoing data classes (shown in Table A, Table B and Table C), the column under the heading DC (data center) serves as a unique index column for the data class.

Service Model

Further, in the foregoing example, a component properties-to-relationships inference model or service model (prepared, e.g., by a modeler) may be provided to discovery system 120. The service model may define a relationship of one component to a second component based on a matching of attributes of the two components, in accordance with the principles of the present disclosure. The service model may define all required relationships needed to draw the graph between the components identified, for example, in Table A, Table B, and Table C above.

The service model (e.g., prepared a modeler) may be in the form of model metadata. In example implementations, metadata constructs—Classes and Relationships, (shown below) may be used for the service model.

Classes:

A class is a definition of a discoverable component.
A class has the following attributes:
   The type name of the component, e.g., Web Server;
   The attributes of the component, e.g., hostname, IP address, listening port, etc.; and
   The specific attributes that define the unique identifier of the component, e.g., hostname.

Relationships:

A relationship defines the properties of two different classes that form a relationship between those two classes when the values of the specified properties match.

An example model metadata for the IT infrastructure EXAMPLE III may be given as:

```
{
    "classes" : {
        "DC": {
            "INDEX": [ "DC" ],
            "ATTR" : [ ]
        },
        "REVERSE_PROXY" : {
            "INDEX" : [ "DC',"URL" ],
            "ATTR" : [ "POOL" ]
        },
        "POOLMEMBER" : {
            "INDEX" : [ "DC", "POOL", "POOLMEMBER" ]
            "ATTR" : [ ]
        }
    },
    "relationships" : {
        "HOSTS" : {
            "DC" : {
                "REVERSE_PROXY" : {
                    "DC" : "DC"
                }
            },
            "REVERSE_PROXY" : {
                "POOLMEMBER" : {
                    "DC" : "DC",
                    "POOL", "POOL"
                }
            }
        }
    }
}
```

Use of the service model may impose a requirement on data collection by the discovery system 120. Discovery system 120 may be required or expected to specify a primary key (PK) attribute and a number of other attributes that describe each component object (e.g., DC, REVERSE_PROXY, and POOLMEMBER) in the inventory data.

The service model is extensible at least in that the number of attributes used to describe each component object can be changed. For example, to add a new property attribute "xx" as an attribute to the POOLMEMBER object, the new attribute values may be collected by expanding the data definition used for inventory data collection (by discovery system 120) to include a column for attribute xx. Further, by adding the new property attribute xx to the list of attributes in the service model, the new property attribute xx can be included in the graph of the IT infrastructure.

In a similar way, the service model can be extended to include additional data classes (e.g., in addition to the three classes described in the IT infrastructure example above). For example if a resource or component "healthmonitor" is added to each poolmember, then a healthmonitor class (with PK fields) can be defined, and the service model extended to define a relationship with it without affecting any of the already collected data.

The number of attributes included in the service model to establish relationships between the components identified in the inventory data may the same number that is sufficient to determine an endpoint of a service in the IT infrastructure network. For example, when connecting a web server to an application server via Representational State Transfer (REST) calls, knowledge of only a few attributes may be needed to identify the endpoint. Recognition of these same few attributes in the model should be sufficient to define the relationship between the web server and the application server.

In example implementations, a network endpoint in the IT infrastructure may be any resource or component (e.g., a load balancer or an app server). The model may be prepared without advance knowledge of which resource or component is the endpoint, or even of the existence of an endpoint in the IT infrastructure. If an endpoint exists, it can be identified by its object attributes, and it can be assumed that a service will be attached to that endpoint.

In operation, system 120 may register a change notifier 128 on the collected inventory data (configuration inventory 126). System 120 may react when the inventory data is changed or updated by activating relationships determiner 124 (and model metadata parser 124A) to parse the updated inventory data (in a "metadata analysis phase") to determine the "indexes" for each of the data classes in the inventory data.

To establish the relationships, an index is required for each source or target relationship and for the PK of the data class. The PK of each data class is by definition constrained to be a unique entity. Other indexes (other than that of the PK) can by definition non-unique. Relationships determiner 124 (and model metadata parser 124A) may confirm the constraint on the uniqueness of the PK when parsing the inventory data. Failure of the uniqueness of the PK constraint may be flagged as an error.

For the IT infrastructure EXAMPLE III, the following indexes may be created (with the PKs shown in bold):
DC(DC)
REVERSE_PROXY(DC,URL), REVERSE_PROXY (DC), REVERSE_PROXY(DC,POOL)
POOLMEMBER(DC,POOL,POOLMEMBER), POOLMEMBER(DC,POOL)

Furthermore, the relations between the indexes may be defined as:
DC(DC)→REVERSE_PROXY(DC)
REVERSE_PROXY(DC,POOL)→POOLMEMBER (DC,POOL).

An example indexing method may support an index system (implemented, for example, in configuration inventory 126) with an interface to add (and query) objects to particular indexes.

An example indexing method may be as follows:
For each of the indexes defined on the class
  /*In case of CLASS=REVERSE_PROXY—it means iterate over indexes
REVERSE_PROXY(DC,URL)
REVERSE_PROXY(DC),
REVERSE_PROXY(DC,POOL) */
For each specific index: create an index of the object using the object PK to identify the object.

Consider, for example, indexing of the first record in Table B above:

| DC | URL | POOL |
|---|---|---|
| HOU | hou-login.example.com | login |

For this example record, the foregoing example indexing method may determine PK to be an index that maps PK ("HOU", "hou-login.example.com") to this record. Further, for the index REVERSE_PROXY("DC") (a non-unique index), the indexing method may ensure that the object is indexed by "HOU" (the DC field). For the index REVERSE_PROXY("DC","POOL"), the indexing method may determine the index to map the indexed object to the ("HOU", "login") tuple.

It will be noted that in the metadata analysis phase, system 120 defines the relationships between indexes and further prepares all the indexes, but does not actually calculate the indexes. The indexes are prepared in system 120 to ensure that the order of two indexes used in a relationship are aligned by column.

For example, for a defined relationship:
REVERSE_PROXY(DC,POOL)→POOLMEMBER (DC,POOL), system 120 in the metadata analysis phase may ensure that the combined indexes (DC,POOL) built on the object REVERSE_PROXY have a same order of columns as the combined indexes built on the object POOLMEMBER.

During an initialization phase of configuration inventory 126, system 120 processes data feeds received by collectors 125 during the metadata analysis phase and loads the data in configuration inventory 126. The data can include data records for each of the data classes with the required indexes that are built using the predefined model metadata. Further, during the initialization phase, change notifier 128 may be registered on configuration inventory 126. Change notifier 128 may notify system 120 in real time of changes to data (e.g., when new data is received by collectors 125) in configuration inventory 126.

A further step in the initialization phase of configuration inventory 126 includes building an extract (e.g., graph 142) of all known relationships and data objects in configuration inventory 126. Graph 142 may be extracted, for example, by a backend graph system (e.g., component-relations database 140). Component-relations graph database 140 may be a graph database that is able to consume/import edge and vertex information quickly.

After the initialization phase of configuration inventory 126, change notifier 128 may notify system 120 in real time of changes to data (e.g., when new data is received by collectors 125) in configuration inventory 126. System 120 may be configured to switch to an update mode upon notification of a change.

In the update mode, system 120 may listen (e.g., using change listener 130) to changes in the source data received via collectors 125. If a source data feed is changed, a change to the data may be included as a new data entry in configuration inventory 126 and indexes for all resource data records may be recalculated by system 120 in the update mode.

System 120 may determine if the new data entry has an unknown PK in the new dataset; if the new data entry is a removed data entry (i.e., the PK present in old dataset is not present in new dataset); or, if the new data entry is a modified entry (i.e., the PK present in old dataset is also present in new dataset, but attributes are different). By determining the changes in the indexes for the changed database objects, system 120 may determine which relationships must be updated and update the relationships accordingly.

In example implementations, the collection of database objects corresponding to the discovered components of the IT infrastructure and the modeling to determine connections between the database objects may be extended to include synthetic objects (i.e., dependent database objects). A synthetic object may be derived or synthetized from the discovered configuration parameters of first class data objects that have an identity independent of any other database object or item (i.e., Table A, Table B, and Table C, etc.). The synthetic object may be auto-vivificated by the first class data objects and may be completely dependent on the first class data objects. However, the synthetic object can participate in relationships determinations as if it is a first class (i.e., an independent) data object, in accordance with the principles of the present disclosure.

A synthetic object may be used to determine relationships between database objects (components) in scenarios where a database object can be linked up in more than one way, but neither the modeler, nor the data collector (discovery tool) knows, a priori, the manner in which the database object (component) will be linked up or connected to other components in the IT infrastructure.

In example implementations, in addition to the previously mentioned metadata constructs Classes and Relationships used for the service model, the metadata constructs used for the "synthetic objects" service model of the IT infrastructure may include the following construct:

Synthetic Objects: A synthetic object defines additional types of components that a specific class may represent.

The purpose of identifying additional components that a class may represent is to allow more generic relationships to be defined between classes without having to concretely define relationships between very specific types of classes. For example, instead of defining a relationship between a Client App and a Web Server, a more generic relationship can be defined between a Client App and a TCP Port. In this example, a "TCP Port" synthetic object would be defined for the Web Server.

For purposes of illustration, the use of a synthetic object in determining the service model and a graph image of the IT infrastructure is described below with reference to the following example IT infrastructure.

IT Infrastructure, Example IV

Consider a scenario in which an example IT infrastructure (e.g., EXAMPLE IV) includes a client application and a web server. These two components are referred to herein as Client Application and Web Server, respectively. The Client Application may be configured to connect to the Web Server via its configuration. The Web Server may provide a service that is consumed by the Client Application.

In this scenario, discovery tools can discover the presence of the Client Application and the Web Server components in the IT infrastructure, but the discovery tools may not be aware of the relationship between the two components and may not discover the relationship or be able to determine if the Client Application is connected to the Web Server. The discovery tools may simply discover the two separate components (i.e., the Client Application and the Web Server) and their attributes.

In this scenario, a model may be constructed using one or more synthetic objects that can provide the relationships between the infrastructure components that are not provided by the discovery tools. The synthetic objects may be defined, for example, by a modeler who is aware of the different components that make up the IT infrastructure and is also aware of how those components are related to each other.

An example model including the synthetic objects may be defined by the following metadata:
   Classes
      Web Server Class
         IP Address
         Host Name
         Listening Port
      Client Application Class
         IP Address
         Hostname
         Web Server Address (This is the IP address Sample Application connects to consume the services provided by a specific Web Server).

Web Server Port (This is the port Sample Application connects to consume the services provided by a specific Web Server).

Synthetic Objects

TCP Port (this is the base definition of a TCP Port)
  IP Address
  Port

Web Server TCP Port (This definition defines the Web Server properties that represent a TCP Port)
  TCP Port.IP Address=Web Server.IP Address
  TCP Port.Port=Web Server.Listening Port.

While it may be assumed that the Client Application should connect to the Web Server, there can be infrastructure instances in which the Client Application may be misconfigured and as a result may not actually connect to the correct endpoint (Web Server). To mitigate, find, or account for such misconfiguration, the model may create a relationship between the Client Application and a TCP Port instead of creating a relationship directly between the Client Application and the Web Server (as shown by the following metadata).

Client Application—Connects to→TCP Port Relationship
Client Application.Web Server IP Address=TCP Port.IP Address
Client Application.Web Server Port=TCP Port.Port The discovery tools (e.g., discovery tools 122) may run and discover both the Client Application and the Web Server. The configuration inventory (e.g., configuration inventory 126) may be populated with the data of both discovered components (i.e., Client Application and the Web Server).

Using the model metadata defined above and the discovered component data, a diagram of the system including classes representing the discovered Client Application and the discovered Web Server can be generated.

Figure 3A:
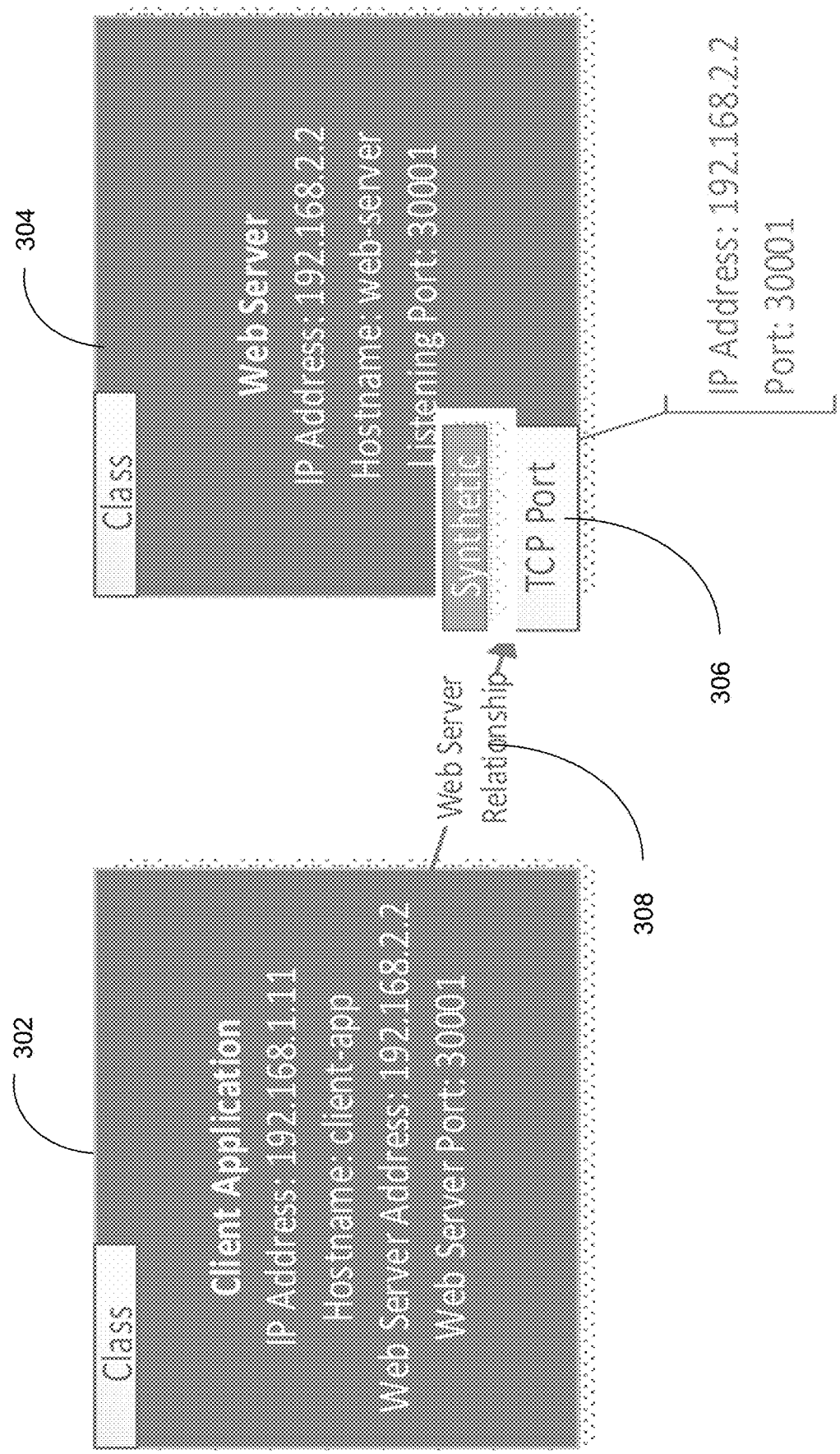
FIG. 3A is a diagram that schematically represents an example infrastructure configuration instance in which a client application is correctly configured to talk to a web server via a Transmission Control Protocol (TCP) port associated with the web server, in accordance with the principles of the present disclosure.

FIG. 3A shows a diagram that schematically represents an example infrastructure configuration instance in which the Client Application is correctly configured to talk to the Web Server via a Synthetic Object (i.e., a TCP port) associated with the Web Server. As shown schematically in FIG. 3A, Class 302 represents the discovered Client Application (e.g., with IP address 192.168.1.11, Hostname: client-app, Web Server address 192.168.2.2 and Web Server port: 30001), Class 304 represents the discovered Web Server (e.g., with IP address 192.168.2.2, Hostname: web-server, Listening Port: 30001).

The discovered Client Application may be found to be properly connected to the Web Server via Listening Port 3001. This found connection may be represented in the model as a relationship (e.g., Web Server relationship 308) to a synthetic object (e.g., TCP PORT 306 at IP Address 192.168.2.2; Port 30001). The connection may characterized by a client application—synthetic object relationship (e.g., Web Server relationship 308).

Figure 3B:
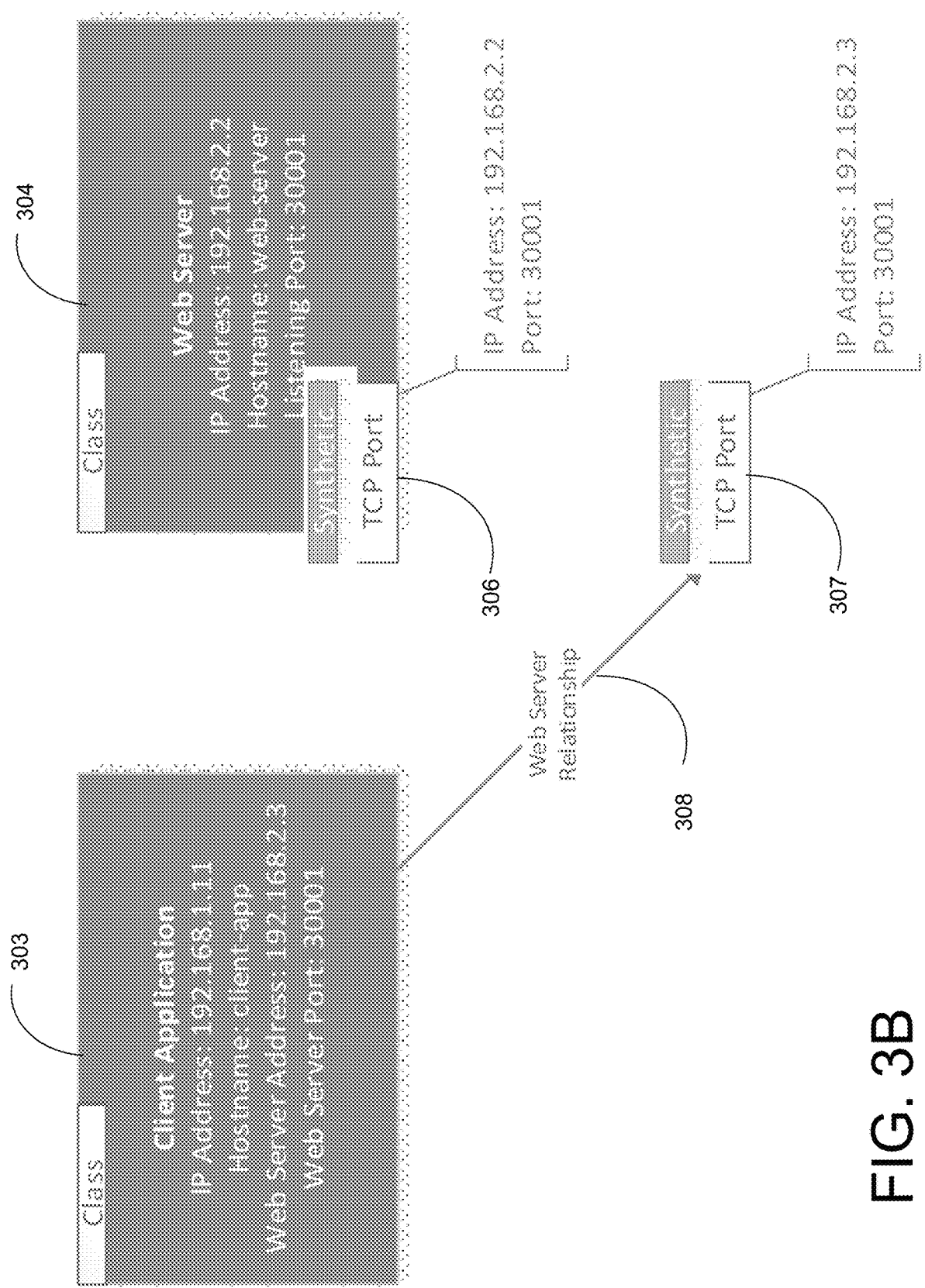
FIG. 3B is a diagram that schematically represents an example infrastructure configuration instance in which a client application is not correctly configured to talk to a web server via a TCP port associated with the web server, in accordance with the principles of the present disclosure.

FIG. 3B shows a diagram that schematically represents an example infrastructure configuration instance in which the Client Application is not properly configured to talk to the Web Server via the TCP port associated with the Web Server.

As shown schematically in FIG. 3B, Class 303 represents a discovered Client Application (e.g., with IP address 192.168.1.11, Hostname: client-app, Web Server address 192.168.2.3 and Web Server port: 30001)). Notably, in this example, the Client Application is configured to use an incorrect Web Server address (e.g., 192.168.2.3) instead of the proper Web Server address (e.g., 192.168.2.2). The discovery tools (e.g., discovery tools 122) may not discover Web Server 304 or any other TCP Port (e.g., synthetic TCP Port 306) with an IP Address of 192.168.2.2. Thus, FIG. 3B shows the Client Application as being connected to a TCP Port (e.g., synthetic TCP Port 307 with an IP address of 192.168.2.3) that is not associated with a Web Server or other infrastructure component.

Figure 3C:
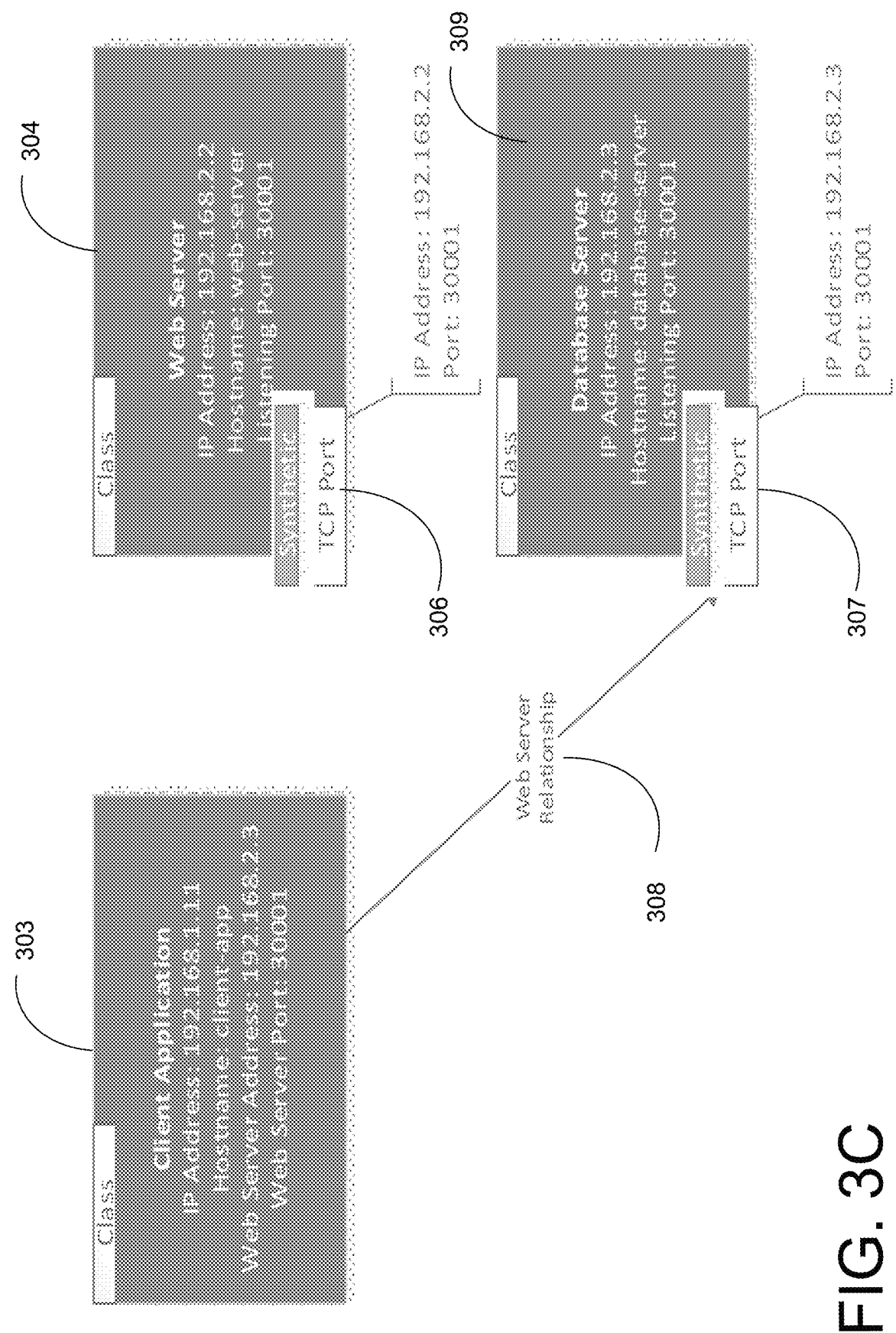
FIG. 3C is a diagram that schematically represents a further example infrastructure configuration instance in which the client application of FIG. 3B is configured to connect to a discovered TCP Port that is not associated with a web server, but is associated with a database server component, in accordance with the principles of the present disclosure.

FIG. 3C shows a diagram that schematically represents a further example infrastructure configuration instance in which Client Application 303 of FIG. 3B is configured to connect to a discovered TCP Port (e.g., synthetic TCP Port 307 having an IP address of 192.168.2.3) that is not associated with a web server, but is associated with a database server component (e.g., Database Server 309 having an IP address 192.168.2.3, Hostname: database-server, and Listening Port: 30001).

By visually inspecting the diagram, which displays the component (e.g., Database Server 309) representing the discovered TCP Port (e.g., synthetic TCP Port 307), it is apparent that the Client Application 303 was misconfigured.

A benefit of modeling IT infrastructure by including synthetic objects in the model is a simplification of the maintenance of the modeling metadata. In addition to simplified metadata, a further benefit may be that misconfigured systems may be easy to identify.

Consider another illustrative example of the use of synthetic objects in service models of an example IT infrastructure. This example demonstrates how using synthetic objects to model data makes the metadata maintenance easier, and also shows how misconfigured systems are easy to identify.

IT Infrastructure, Example V

In this example, the IT infrastructure may include an "Elasticsearch" component (which is a commercially available distributed, RESTful search and analytics engine) in addition to other components (such as web servers and client applications). Components in the IT infrastructure may send their logs to the Elasticsearch component via a connection to a TCP port exposed by the Elasticsearch component.

Further, in this example, consider replacing a component in the infrastructure that provides a specific service with a new component that provides a similar service. Modeling such a change to the IT infrastructure may require many metadata changes if relationships between specific components are defined directly between those components. However, using synthetic objects in the modeling can significantly reduce the number of metadata changes required to model the changes to the IT infrastructure.

In an example implementation, the metadata describing the IT infrastructure may contain the following definitions for Classes, synthetic objects, and relationships.

Classes: Classes for each component the IT infrastructure (i.e., Web Servers and Client Applications) including the Elasticsearch component;

Synthetic objects: A synthetic object (e.g., a "TCP Port" synthetic object) associated with each Elasticsearch component. This metadata indicates that the Elasticsearch component is also a TCP port; and Relationships: Relationships between components that use Elasticsearch and a TCP Port synthetic object. These relationships are to a generic TCP Port, and not to the specific Elasticsearch TCP Port. The relationships may, for example, be titled "Log Export".

As an example of the limited changes to the model metadata to respond to changes in the IT infrastructure, consider an instance in which an Elasticsearch component is replaced by an Apache Solr component (which is a commercially available combination of a search engine and a distributed document database with structured query language (SQL) support).

In example implementations, the discovery tools (e.g., discovery tools 122) may discover the new Apache Solr component. Additionally, the discovery tools may discover additional configuration attributes of the various components that use the new Apache Solr component. The only changes required to the model metadata (in response to the component replacement) may be minimal. The required changes may be as follows:

Create a new class object for the Apache Solr component; and create a TCP Port synthetic object for the Apache Solr component.

No changes to any of the existing defined relationships in the model are needed since the existing relationships are between components and a TCP Port, and not between components and the Elasticsearch components or the Apache Solr components. In other words, new relationships between each existing component in the IT infrastructure and the new Apache Solr component do not have to be created in the model metadata.

With the foregoing minimal metadata changes, once new data is collected, a visualization of the IT infrastructure may immediately display relationships between components and the Apache Solr component. Additionally, any existing relationships between components of the IT infrastructure and the unreplaced Elasticsearch components may also be displayed, giving a clear picture of which components are using the new Apache Solr component and which components are still using the old Elasticsearch component (or even which components of the IT infrastructure are using both the old Elasticsearch and the new Apache Solr component).

As previously described herein (e.g., FIG. 3B), if a relationship is defined in the model metadata between a component and a TCP Port synthetic object, the relationship will be shown in the visualization, regardless of what other specific component actually defines that TCP Port synthetic object (or in other words, regardless of which specific component the TCP Port synthetic object is a sub part of). This ensures the visualization shows the actual state of the IT infrastructure, even when the IT infrastructure is misconfigured.

As an example of how a misconfigured system may be visualized, consider a scenario in which an IT infrastructure component (e.g., a first component) is accidentally configured to connect to an email server component (which also has a TCP Port) instead of an Apache Solr component. In this scenario, the first component will be unable to send logs to the Apache Solr component (e.g., because the first component is actually configured with the IP Address and Port of the email server component). This misconfiguration of the IT infrastructure is likely to cause the misconfigured first component to receive errors when it tries to send its logs to what it thinks is Apache Solr component but is in reality an email server component.

In this scenario, the visualization (e.g., like in FIG. 3C) will show a relationship between misconfigured first component and the email server component. The visualization will readily reveal that the relationship (i.e., a Log Export relationship) to the email server component is incorrect because the email server component is known for receiving e-mails and not logs from other components.

Consider an example IT infrastructure (EXAMPLE III) which has discovery data collected in two example data classes: WEBSERVER and APPSERVER (shown, for example, in TABLE D and TABLE E below).

TABLE D (WEB SERVER: List of web servers with their appserver IP)

| WWWIP | WWWPORT | APPSRVIP | APPSRVPORT |
|---|---|---|---|
| 10.0.0.1 | 80 | 10.100.0.1 | 80 |
| 10.0.0.2 | 80 | 10.100.0.1 | 80 |
| 10.0.0.3 | 80 | 10.100.1.1 | 80 |
| 10.0.0.4 | 80 | 10.100.1.1 | 80 |

TABLE E (APPSERVER: List of application servers with their IP and the backend database (DB) they connect to)

| IP | PORT | DB |
|---|---|---|
| 10.100.0.1 | 80 | POC |
| 10.100.2.1 | 80 | shared |
| 10.100.2.2 | 80 | shared |
| 10.100.2.3 | 80 | shared |

TABLE D has column headings WWWIP, WWWPORT, APPSRVIP, and APPSRVPORT. The data entries (e.g., IP addresses: 10.0.0.1, 10.0.0.2, 10.0.0.3, 10.0.0.4) in column WWWIP identify a list of web servers and the data entries in column AAPSRVIP identify the corresponding appserver's IP address (e.g., 10.100.0.1, 10.100.0.1, 10.100.1.1, 10.100.1.1). The data entries (e.g., 80) under the column headings WWWPORT, and APPSRVPORT indicate the connection ports of the web servers and the appservers, respectively TABLE E has column headings IP, PORT, DB. The data entries (e.g., IP addresses: 10.100.0.1, 10.100.2.1, 10.100.2.2, 10.100.2.3) in column IP identify a list of appservers, the data entries (e.g., 80) in column PORT indicate the connection ports of the appservers and the data entries (e.g., POC, shared, shared, and shared) in column DB identify the databases (DB) to which the appservers are connected.

As seen from Table D, the first two web servers (i.e., 10.0.0.1 and 10.0.0.2) in column WWWIP both connect to a single appserver (i.e., 10.100.0.1). The connections are direct connections to the IP address of the appserver (i.e., 10.100.0.1, listed in TABLE E) via PORT 80. Further, the second two web servers (i.e., 10.0.0.3 and 10.0.0.4) in column WWWIP connect to a different appserver IP address (i.e., 10.100.1.1). The three remaining appservers (i.e., appservers with IP addresses 10.100.2.1, 10.100.2.2 and 10.100.2.3) (Table E) do not have an inbound connection from the web servers listed in Table D.

Furthermore, the discovery data collected for IT infrastructure (EXAMPLE III) may include two more example data classes: VIP and POOLMAP (shown, for example, in TABLE F and TABLE G below).

TABLE F (VIP : List of Virtual IPs and the pool that is providing the service for that IP address)

| VIPIP | VIPPORT | POOL |
|---|---|---|
| 10.100.1.1 | 80 | sharedpool |

TABLE G (POOLMAP: List of pools and the IP addresses of backend servers)

| POOL | MEMBERIP | MEMBERPPORT |
|---|---|---|
| sharedpool | 10.100.2.1 | 80 |
| sharedpool | 10.100.2.2 | 80 |
| sharedpool | 10.100.2.3 | 80 |

As seen from the foregoing TABLES D-G, IT infrastructure (EXAMPLE III) may have two types of connections to the database object WEB SERVER:

WEB SERVER→APPSERVER, and
WEB SERVER→VIP→POOLMAP→APPSERVER.

A challenge in graphing the foregoing IT infrastructure (EXAMPLE III) is that neither the modeler, nor the data collector, may know ahead of time how these infrastructure components (in Tables D and F) will be connected or linked up in the network. System 120 solves this challenge by creating one or more synthetic objects (e.g., synthetic object "TCPPORT") that can contain the relationships needed to network or link up the infrastructure components (e.g., in Tables D and F) in IT infrastructure (EXAMPLE III).

A set of relationships that are needed to network or link up the infrastructure components and are enabled in the example by the synthetic object TCPPORT, may, for example, include (TCPPORT)→WEB SERVER→(TCPPORT)
(TCPPORT)→VIP→POOLMAP→(TCPPORT)
(TCPPORT)→APPSERVER.

These relations may be included in an example definition of synthetic object TCPPORT. Synthetic object TCPPORT can participate in modelling relationships as if it were a first class data object.

An example definition of synthetic object TCPPORT may be:

```
{
    "TCPPORT" : {
        "INDEX" : [
            "IP",
            "PORT"
        ],
        "FROM": {
            "WEBSERVER" : [{
                "IP" : "WWWIP",
                "PORT" : "WWWPORT"
            }, {
                "IP" : "APPSRVIP",
                "PORT" : "APPSRVPORT"
            }],
            "VIP" : {
                "IP" : "VIPIP",
                "PORT" : "VIPPORT"
            },
            "POOLMAP" : {
                "IP" : "MEMBERIP",
                "PORT" : "MEMBERPORT"
            },
            "APPSERVER": {
                "IP" : "IP",
                "PORT" : "PORT"
            }
        }
    }
}
```

This definition of synthetic object TCPPORT can create dependent data objects (e.g., DEVICEPORT), such as shown, for example, in TABLE H below.

TABLE H (DEVICEPORT)

| | |
|---|---|
| 10.0.0.1 | 80 |
| 10.0.0.2 | 80 |
| 10.0.0.3 | 80 |
| 10.0.0.4 | 80 |
| 10.100.0.1 | 80 |
| 10.100.1.1 | 80 |
| 10.100.2.1 | 80 |
| 10.100.2.2 | 80 |
| 10.100.2.3 | 80 |

The dependent data objects (e.g., DEVICEPORT) can be reference-counted and auto-destroyed when their defining objects are removed.

The dependent data objects (e.g., DEVICEPORT) can be used to build any kind of relationships, and thus can be used build dynamic constructs where the topology of the IT infrastructure is not known ahead of time.

For example, defining the following relationships in synthetic object TCPPORT:

(TCPPORT)→WEB SERVER→(TCPPORT)
(TCPPORT)→VIP→POOLMAP→(TCPPORT)
(TCPPORT)→APPSERVER, may enable visualization of expected connections (e.g., with reference to TABLES D-F):

(TCPPORT)→WEB SERVER→(TCPPORT)→APPSERVER
(TCPPORT)→WEB SERVER→(TCPPORT)→VIP-→POOLMAP→(TCPPORT)→APPSERVER, but also can enable visualization of unexpected configurations such as:

(TCPPORT)→WEB SERVER→(TCPPORT)→WEB SERVER
(TCPPORT)→WEB SERVER→(TCPPORT)→VIP-→POOLMAP→(TCPPORT)→WEBSERVER
(TCPPORT)→WEB SERVER→(TCPPORT)→VIP-→POOLMAP→(TCPPORT)→VIP

Revealing or finding these "unexpected" relations does not require any additional configuration of synthetic object TCPPORT. The unexpected" relations are implicit, simply because synthetic object TCPPORT is basically a glue that can connect various different relationship chains.

In example implementations, the synthetic objects used in the service model can be an object type that relates to communications. In example implementations, candidates for the synthetic object types may include a broadcast address, a queue, a stream, etc., or any kind of application-specific construct that allows or involves communication between components of the IT infrastructure.

Figure 4:
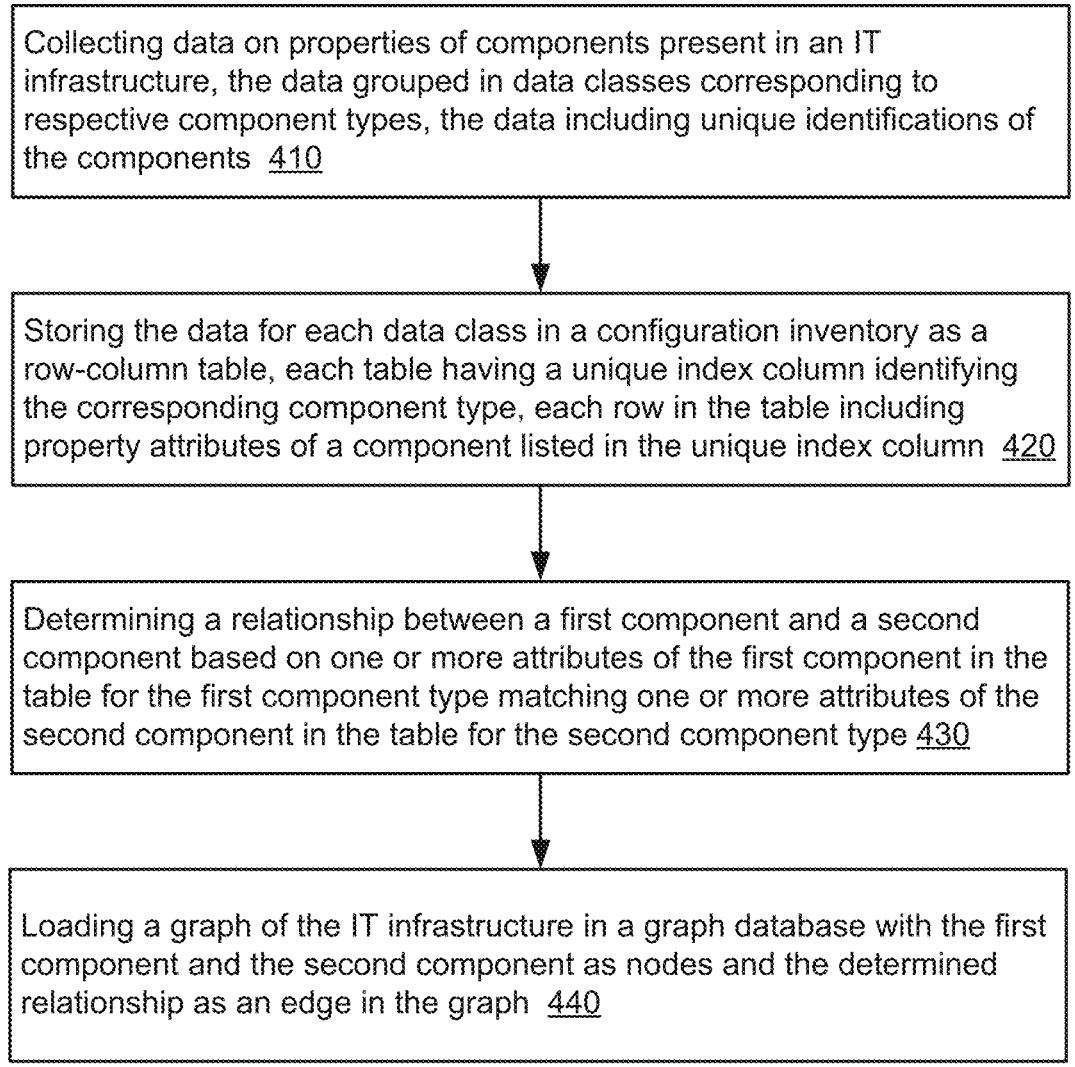
FIG. 4 is an illustration of an example method for preparing a graph of inter-connected components of an IT infrastructure, in accordance with the principles of the present disclosure.

FIG. 4 shows an example method 400 for preparing a graph of inter-connected components of an IT infrastructure, in accordance with the principles of the present disclosure.

Method 400 includes collecting data on properties of components present in the IT infrastructure, the data grouped in data classes corresponding to respective component types, the data including unique identifications of the components (410), and further storing the data for each data class in a configuration inventory (i.e., a store or database) as a row-column table, each table having a unique index column identifying the corresponding component type, each row in the table including property attributes of a component listed in the unique index column (420).

Method 400 further includes determining a relationship between a first component and a second component based on one or more attributes of the first component in the table for the first component type matching one or more attributes of the second component in the table for the second component type (430), and loading a graph database with the first component and the second component as nodes and the determined relationship as an edge in a graph (440).

In method 400, collecting data on properties of components present in the IT infrastructure 410 may include deploying an asset discovery tool to scan or ping the IT infrastructure to discover the components of the IT infrastructure. In example implementations, the asset discovery tool that is used to discover the components may deploy a method that involves a pull from an instrumented application, a push to an instrumented application, or a pull through a helper application for an uninstrumented application.

In method 400, the properties data of the components may, for example, include one or more attributes of the components, such as location, datacenter, URL, IP address, port, protocol, customer, and service name attributes of the components.

In method 400, collecting data on properties of components present in the IT infrastructure 410 may include collecting data under a data definition that contains a unique index column for each data class.

In method 400, establishing a relationship between a first component and a second component may include reference to a pre-defined relation inference model that includes relationship definitions based on the attributes in the table for the first component and the attributes in the table for the second component.

Method 400 may further include using a synthetic object in the pre-defined relation inference model to connect different relationship chains between the first component and the second component, the synthetic object being derived from the data classes.

Method 400 may further include registering a change notifier on the configuration inventory, and in response to a change notification, re-determining the relationships between components of the IT infrastructure.

Figure 5:
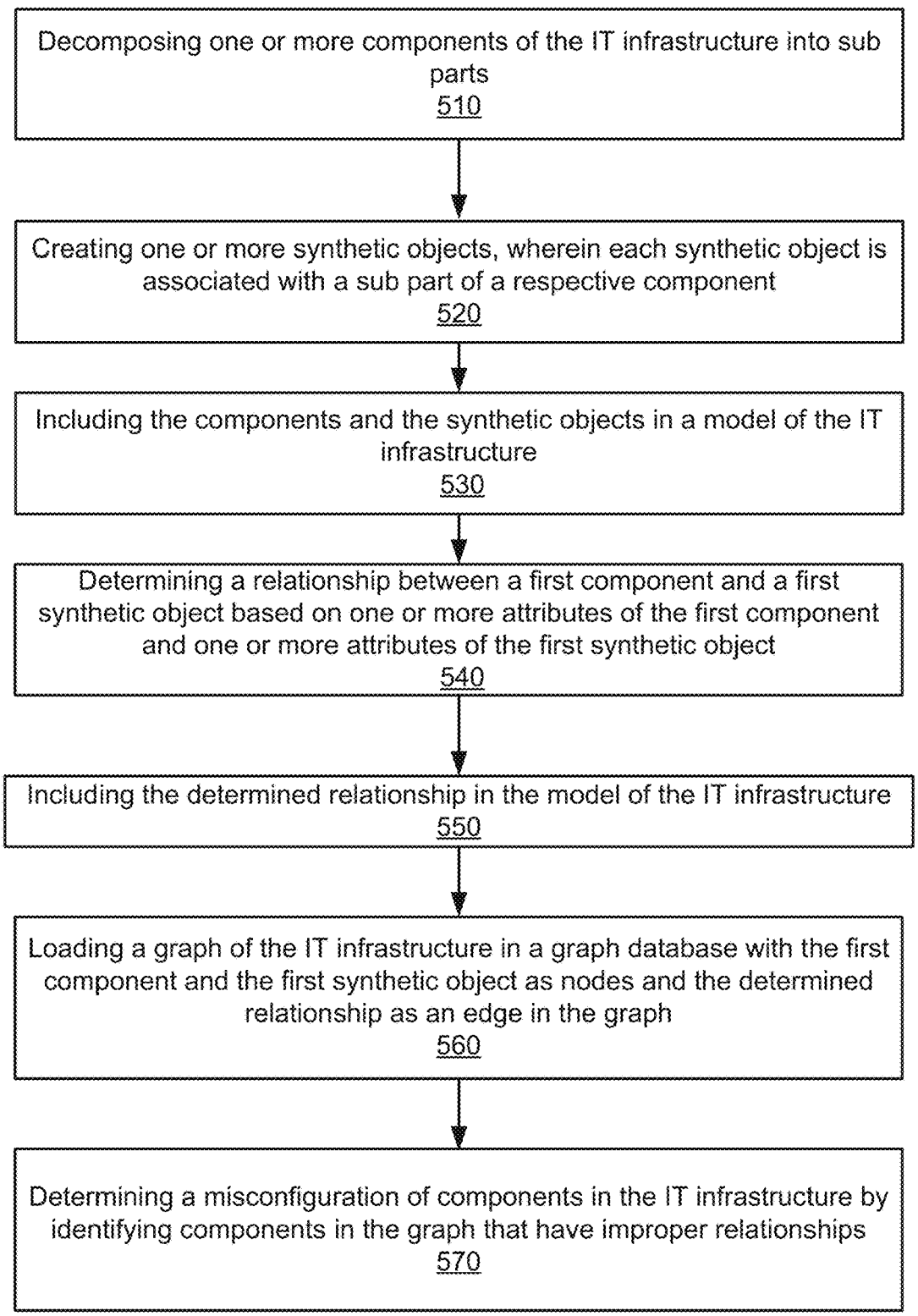
FIG. 5 is an illustration of an example method for determining a misconfiguration of components in an IT infrastructure, in accordance with the principles of the present disclosure.

FIG. 5 shows an example method 500 for determining a misconfiguration of components in an Information Technology (IT) infrastructure.

Method 500 includes decomposing one or more components of the IT infrastructure into sub parts (510), and creating one or more synthetic objects, wherein each synthetic object is associated with a sub part of a respective component (520).

Method 500 further involves including the components and the synthetic objects in a model of the IT infrastructure (530), determining a relationship between a first component and a first synthetic object based on one or more attributes of the first component and one or more attributes of the first synthetic object (540), and including the determined relationship in the model of the IT infrastructure (550).

Method 500 further involves loading a graph of the IT infrastructure in a graph database with the first component and the synthetic object as nodes and the determined relationship as an edge in the graph (560), and determining the misconfiguration of components in the IT infrastructure by identifying components in the graph that have improper relationships (570).

In example implementations, the misconfigured components having improper relations may be shown or highlighted in a visual display of the graph (e.g., as shown in FIG. 3B).

In method 500, viewing of the misconfiguration of components may be facilitated by displaying the graph on a user interface (e.g., display 15). Visual inspection of the displayed graph may, for example, readily reveal which components have improper relations, i.e., are misconfigured.

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine readable-storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (applicationspecific-integrated circuit).

Processors suitable for the processing of a computer program include, by way of example, both general and special purpose microprocessors, and any one or more processors of any kind of digital computer. Generally, a processor will receive instructions and data from a read-only memory or a random access-memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A method for determining a misconfiguration of components in an Information Technology (IT) infrastructure, the method comprising:
    determining a generic synthetic object that includes a plurality of relationships that connect a corresponding plurality of component classes of the IT infrastructure, including a communications interface;
    creating a synthetic object from the generic synthetic object and specific to a first component class of the plurality of component classes;
    including, in a model of the IT infrastructure, the synthetic object, a first component of the first component class and a second component of a second component class of the plurality of component classes;
    determining a relationship between the second component and the synthetic object based on a matching of one or more attributes of the second component and one or more attributes of the synthetic object, the relationship being included in the plurality of relationships and having a relationship type defined by the second component class;
    including the determined relationship in the model of the IT infrastructure;
    loading the model of the IT infrastructure in a database as a graph with the second component and the synthetic object as nodes and the determined relationship as an edge in the graph between the nodes; and
    identifying a misconfiguration of the components in the IT infrastructure by identifying a correspondence failure between the synthetic object and the first component, the correspondence failure including at least one of a mismatch between the relationship type and the first component class, or an identification of the synthetic object within the graph as being connected to the second component and not connected to the first component.

2. The method of claim 1, further comprising: displaying the graph on a user interface for visual determination of the misconfiguration of components in the IT infrastructure, independent of which respective component the synthetic object is a sub-part of, and including displaying the determined relationship between the second component and the synthetic object in the graph.

3. The method of claim 1, wherein the synthetic object is associated with a communication interface of the first component class, the communication interface allowing communication with another component class of the IT infrastructure.

4. The method of claim 3, wherein the communication interface of the first component class is an application endpoint.

5. The method of claim 4, wherein the synthetic object is an application specific construct that allows communication involving one of a broadcast address, a queue, or a stream.

6. The method of claim 1, wherein the synthetic object is a transmission control protocol (TCP) port.

7. The method of claim 1, wherein each component of the IT infrastructure is represented by a respective class object in the model, wherein each class object includes configuration parameters of the component including one or more of a component type name, a host name, and an IP address, and wherein the synthetic object is derived from the configuration parameters of class objects that have an identity independent of any other class object.

8. A computer system for determining misconfigurations of components in an Information Technology (IT) infrastructure, the computer system comprising:
    a processor;
    a memory; and
    a graph database,
the memory including instructions that when executed by the processor:
    determine a generic synthetic object that includes a plurality of relationships that connect a corresponding plurality of component classes of the IT infrastructure, including a communications interface;
    create a synthetic object from the generic synthetic object and specific to a first component class of the plurality of component classes;
    include, in a model of the IT infrastructure, the synthetic object, a first component of the first component class and a second component of a second component class of the plurality of component classes;
    determine a relationship between the second component and the synthetic object based on a matching of one or more attributes of the second component and one or more attributes of the synthetic object, the relationship being included in the plurality of relationships and having a relationship type defined by the second component class;
    include the determined relationship in the model of the IT infrastructure;
    load the model of the IT infrastructure in a database as a graph with the second component and the synthetic object as nodes and the determined relationship as an edge in the graph between the nodes; and
    identify a misconfiguration of the components in the IT infrastructure by identifying a correspondence failure between the synthetic object and the first component, the correspondence failure including at least one of a mismatch between the relationship type and the first component class, or an identification of the synthetic object within the graph as being connected to the second component and not connected to the first component.

9. The computer system of claim 8, wherein the instructions when executed by the processor, independent of which respective component the synthetic object is a sub-part of, display the graph on a user interface for visual determination of the misconfiguration of components in the IT infrastructure, including displaying the determined relationship between the second component and the synthetic object in the graph.

10. The computer system of claim 8, wherein the synthetic object is associated with a communication interface of the first component class, the communication interface allowing communication with another component class of the IT infrastructure.

11. The computer system of claim 10, wherein the communication interface of the first component class is an application endpoint.

12. The computer system of claim 11, wherein the synthetic object is an application specific construct that allows communication involving one of a broadcast address, a queue, or a stream.

13. The computer system of claim 8, wherein the synthetic object is a transmission control protocol (TCP) port.

14. The computer system of claim 8, wherein each component of the IT infrastructure is represented by a respective class object in the model, each class object including configuration parameters of the component including one or more of a component type name, a host name, and an IP address, and wherein the synthetic object is derived from the configuration parameters of class objects that have an identity independent of any other class object.

15. A computer program product including instructions recorded on a non-transitory computer-readable storage medium and configured to cause a processor to determine a misconfiguration of components in an Information Technology (IT) infrastructure, the instructions including instructions that when executed by the processor cause the processor to:
- determine a generic synthetic object that includes a plurality of relationships that connect a corresponding plurality of component classes of the IT infrastructure, including a communications interface;
- create a synthetic object from the generic synthetic object and specific to a first component class of the plurality of component classes;
- include, in a model of the IT infrastructure, the synthetic object, a first component of the first component class and a second component of a second component class of the plurality of component classes;
- determine a relationship between the second component and the synthetic object based on a matching of one or more attributes of the second component and one or more attributes of the synthetic object, the relationship being included in the plurality of relationships and having a relationship type defined by the second component class;
- include the determined relationship in the model of the IT infrastructure;
- load the model of the IT infrastructure in a database as a graph with the second component and the synthetic object as nodes and the determined relationship as an edge in the graph between the nodes; and
- identify a misconfiguration of the components in the IT infrastructure by identifying a correspondence failure between the synthetic object and the first component, the correspondence failure including at least one of a mismatch between the relationship type and the first component class, or an identification of the synthetic object within the graph as being connected to the second component and not connected to the first component.

16. The computer program product of claim 15, wherein the instructions when executed by the processor, independent of which respective component the synthetic object is a sub-part of, display the graph on a user interface for visual determination of the misconfiguration of components in the IT infrastructure, including displaying the determined relationship between the second component and the synthetic object in the graph.

17. The computer program product of claim 15, wherein the synthetic object is associated with a communication interface of the first component class, the communication interface allowing communication with another component class of the IT infrastructure.

18. The computer program product of claim 17, wherein the communication interface of the first component class is an application endpoint.

19. The computer program product of claim 18, wherein the synthetic object is an application specific construct that allows communication involving one of a broadcast address, a queue, or a stream.

20. The computer program product of claim 15, wherein the synthetic object is a transmission control protocol (TCP) port.

21. The computer program product of claim 15, wherein each component of the IT infrastructure is represented by a respective class object in the model, wherein each class object including configuration parameters of the component including one or more of a component type name, a host name, and an IP address, and wherein the synthetic object is derived from the configuration parameters of class objects that have an identity independent of any other class object.

* * * * *